(12) United States Patent
Gronwald

(10) Patent No.: US 8,295,019 B2
(45) Date of Patent: Oct. 23, 2012

(54) POLARITY REVERSAL PROTECTION UNIT

(75) Inventor: Frank Gronwald, Bedburg (DE)

(73) Assignee: Auto Kabel Managementgesellschaft mbH, Hausen i.W. (DE)

( * ) Notice: Subject to any disclaimer, the term of this patent is extended or adjusted under 35 U.S.C. 154(b) by 360 days.

(21) Appl. No.: 12/668,442

(22) PCT Filed: May 27, 2008

(86) PCT No.: PCT/EP2008/056467
§ 371 (c)(1),
(2), (4) Date: Feb. 5, 2010

(87) PCT Pub. No.: WO2009/010328
PCT Pub. Date: Jan. 22, 2009

(65) Prior Publication Data
US 2010/0172061 A1 Jul. 8, 2010

(30) Foreign Application Priority Data
Jul. 13, 2007 (DE) .................... 10 2007 033 183

(51) Int. Cl.
*H02H 3/00* (2006.01)
*H01H 47/32* (2006.01)
*H01H 50/121* (2006.01)
(52) U.S. Cl. ........................... 361/84; 320/165
(58) Field of Classification Search ............ 361/84; 320/165
See application file for complete search history.

(56) References Cited

U.S. PATENT DOCUMENTS
2006/0232901 A1* 10/2006 Bierbaum et al. ............ 361/93.1

FOREIGN PATENT DOCUMENTS
| DE | 19620204 A1 | 11/1997 |
| DE | 19719919 A1 | 11/1998 |
| DE | 19732650 A1 | 2/1999 |
| DE | 19901351 A1 | 7/2000 |
| DE | 1011252 A1 | 9/2002 |

OTHER PUBLICATIONS

European Patent Office, International Search Report, PCT/EP2008/056476, dated Sep. 3, 2008.

* cited by examiner

*Primary Examiner* — Dharti Patel
(74) *Attorney, Agent, or Firm* — Sunstein Kann Murphy & Timbers LLP

(57) ABSTRACT

The polarity reversal protection unit comprises a pyrotechnic disconnecting unit, a detector device, a tripping element, a first connection element electrically connected with at least one consumer connection and a second connection element electrically connecting a supply support point with the first connection element. The pyrotechnic disconnecting unit is arranged on at least one of the connection elements. The tripping element has a first connection, electrically insulated from the connection elements, to the detector device and a second connection to one of the connection elements, so that a current flow in the tripping element causes a triggering of the pyrotechnic disconnecting unit. The triggering of the pyrotechnic disconnecting unit causes an electrical disconnection of the first and second connection elements.

23 Claims, 2 Drawing Sheets

POLARITY REVERSAL PROTECTION UNIT

Figure 1:
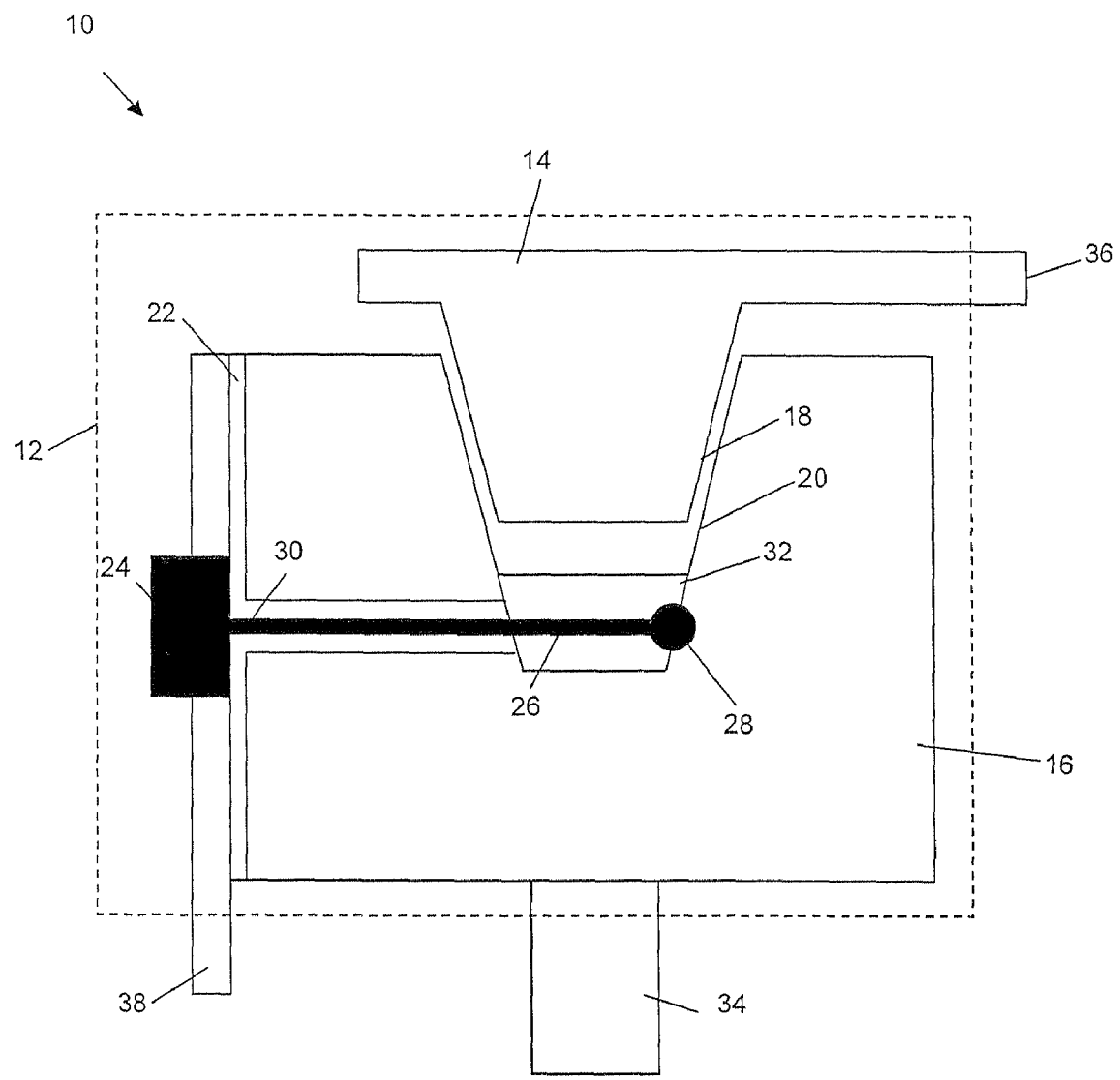

The application relates in general to a polarity reversal protection unit to protect consumers, in particular consumers of a vehicle electrical system of a motor vehicle, against polarity reversal of a supply battery, in particular during an external start.

Motor vehicles have increasingly extensive vehicle electrical systems with a large number of consumers. A vehicle electrical system is generally powered with energy from a vehicle battery. The negative terminal of the vehicle battery is normally connected to the vehicle frame. Some consumers of a vehicle electrical system have a directional current flow characteristic and can be damaged or even destroyed if operated with a current that is the opposite of that of its current flow characteristic. Examples of such consumers are electrolytic capacitors or semiconductor switches. With electrolytic capacitors in particular consequential damage can also occur since these may explode and damage other components if there is an undue reversal of polarity.

A polarity reversal can occur if a new battery is installed in the vehicle or the battery is disconnected for a short period from the vehicle electrical system and then reconnected. Furthermore, in particular in the event of an external start or when the battery is being charged a reversal of polarity may occur. There is also an additional danger that despite the correct polarity, for example of an external battery, the operating voltage of this external battery exceeds the operating voltage of the vehicle battery. This increased voltage can likewise result in damage to consumers within the vehicle electrical system. For example, charging a car battery with a truck battery can damage a vehicle electrical system because the latter battery has a higher operating voltage.

Repair of a vehicle electrical system as a result of destruction, for example due to polarity reversal, can result in high financial costs.

For the above reasons it is evident that the use of a polarity reversal protection unit in motor vehicles is necessary to protect the consumers of a vehicle electrical system.

Polarity reversal protection units are known from the prior art. For example, in DE 101 11 252 A1 a polarity reversal protection circuit is disclosed, with a pyrotechnic disconnecting element. The explosive charge is triggered if a current flows through a diode provided for monitoring an external start support point. At the same time this diode serves as a tripping element and detector device. A current flows only if an incorrect polarity of a connected battery is present. In this case the diode provided for this purpose is operated in the direction of flow. As a result of the heat generated by the current in the diode the explosive charge is triggered. The metallic disconnecting element has a predetermined breaking point so that when the pyrotechnic disconnecting element surrounding the diode is triggered the vehicle electrical system is disconnected from the vehicle electrical system supply.

A disadvantage of this design, however, is that the diode is arranged within the pyrotechnic disconnecting element. If the pyrotechnic disconnecting element is triggered the detector device is consequently destroyed at the same time. On top of this the metallic disconnection element is destroyed. A protective casing is necessary to protect neighbouring components from hot and cold particles. Cost-effective manufacture and repair of such a polarity reversal protection circuit is not possible.

The technical object of the application is therefore to provide a polarity reversal protection unit which on the one hand can be manufactured and repaired at reasonable cost and on the other guarantees error-free operation.

This and other objects are achieved according to the application by a polarity reversal protection unit. The polarity reversal protection unit comprises a pyrotechnic disconnecting unit, a detector device, a tripping element, a first connection element electrically connected with at least one consumer connection and a second connection element electrically connecting a supply support point with the first connection element. The pyrotechnic disconnecting unit is arranged on at least one of the connection elements. The tripping element has a first electrical connection, electrically insulated from the connection elements, to the detector device and a second connection to one of the connection elements, so that a current flow in the tripping element causes a triggering of the pyrotechnic disconnecting unit. The triggering of the pyrotechnic disconnecting unit causes an electrical disconnection of the first and second connection elements.

The polarity reversal protection unit according to the application can preferably be used in motor vehicles. Here the polarity reversal protection unit can be arranged between a supply support point, in particular an external start support point or a charging support point, and a consumer connection, in particular a connection point of an vehicle electrical system. In normal operation the connection elements are electrically connected to each other, meaning that the consumers of a vehicle electrical system can be supplied with power.

The positive terminal of the vehicle battery can be arranged both on the first and the second connection element. The negative terminal of the battery is generally directly connected to the vehicle frame.

A tripping element is arranged between the connection elements, in order to trigger a pyrotechnic disconnecting unit arranged on the tripping element in the event of a reversal of polarity. The tripping element is preferably at least partly arranged within the pyrotechnic disconnecting unit.

It has been identified that an immediate triggering of the pyrotechnic disconnecting unit as a result of a reversal of polarity can be tripped by a flow of current from one of the connection elements to the detector device. For this purpose the tripping element has two connections. The second connection of the tripping element is connected with one of the connection elements. For example, this second connection can be connected with the second connection element.

The tripping element also has a first connection, which is connected to the detector device. This first connection is insulated from the connection elements. The first connection can be completely surrounded by an insulator at least from the detector device as far as the transition from the connection element to the pyrotechnic disconnecting unit. In the event of a reversal of polarity the detector device becomes conductive. Since the tripping element in the area of the first connection is insulated from the connection element, a directly induced current flow from a connection element via the first connection to the detector device is avoided. A current is only induced via the second connection in the tripping element, so that in the event of a reversal of polarity a current flows through the tripping element arranged on the pyrotechnic disconnecting unit to the detector device. As a result of the heat given off by the tripping element the thermally operated pyrotechnic disconnecting unit is triggered.

This provides guaranteed protection of consumers through immediate disconnection of these consumers from a supply support point in the event of a reversal of polarity. The active polarity reversal protection unit is characterised by being compact and economical to manufacture.

According to a further embodiment the detector device is arranged externally on the connection elements. At least one of the connection elements can have an opening. Through this opening the first insulated connection of the first tripping element can be passed into the inside of the connection element, for example in the vicinity of the disconnecting unit. For example, the second connection element has such an opening. The opening can for example be created by a bore hole. The bore hole is preferably horizontal, but other courses for the bore hole are also conceivable. The tripping element can be connected with the externally arranged detector device. The first connection along with its surrounding insulating layer can be arranged within the opening by material connection (firmly bonded, materially joined) with the connection element.

The arrangement of the detector device externally to the connection elements allows reliable operation. Exchanging the detector device is associated with only low cost. Furthermore the detector device can be reused in the event of triggering. It is not destroyed during disconnection of the connection elements by the triggering of the pyrotechnic disconnecting unit. Reuse of the detector device allows savings in repair costs.

Triggering of the pyrotechnic disconnecting element is preferably brought about by a Joule heat generated by the current flow in the tripping element. Any flow of current through an electrical resistor is accompanied by an increase in temperature in the resistor. The Joule heat Q that is generated here is proportional to the product of the resistance R and the square of the current I flowing through the resistor ($Q \sim R*I^2$). Furthermore, the resistance R is dependent, inter alia, on the section A of the resistance R and the specific resistance $\rho$ of the material used.

The Joule heat needed to trigger the pyrotechnic disconnecting unit depends upon the explosive charge used, in particular the chemical composition of the explosive charge. For the explosive charge a thermite can be used, for example. In principle, however, all mixtures can be used which can be thermally activated, that is to say which through the addition of heat are able to generate a sufficiently high gas pressure to release the force fit connection compound. The pyrotechnic disconnecting unit should in particular have a high service life, for example one that corresponds to the service life of the vehicle.

According to the application for the tripping element a resistor will be used with a section and in a material such that when current flows through it a high Joule heat is generated. The connection elements also comprise a material for which a current flow only generates a low Joule heat. Here it is preferable if the pyrotechnic disconnecting unit has an activation temperature, which is above the Joule heat generated by a permitted current flow from the supply support point to the consumer connection. The permitted current flow can be such that during a normal charging process this lies between the external start support point and the battery to be charged. In the event of a fully discharged battery short-time currents of above 100 A may flow. Furthermore it is preferred if the Joule heat generated in the tripping element is at least above the necessary activation temperature of the pyrotechnic disconnecting unit. This activation temperature is above that of the Joule heat given off by the connection elements themselves. In this way it can be guaranteed that false triggering in the event of a charging process is prevented and at the same time in the event of a reversal of polarity immediate disconnection of the consumers from the supply support point takes place.

On the one hand the Joule heat given off both by the tripping element and the connection elements can be adjusted by means of their section and on the other the activation temperature of the pyrotechnic disconnecting unit can be adjusted by means of the material-dependent specific resistance. For example, an increase in the section leads to lower resistance. Furthermore different materials can be used in order to obtain the desired amount of Joule heat to be generated by the respective components. In particular the specific resistance of the tripping element should be greater than the specific resistance of the connection elements. Furthermore, an activation current of the tripping element, which may to a minor extent be affected by external climatic conditions, which should be taken into account at the design stage, can be adjusted.

The detector device preferably comprises at least a semiconductor element. Semiconductor elements used may be diodes or transistors. In addition the detector device can have other components such as for example a limiting resistor. A limiting resistor could be used for limiting the activation current.

In a further embodiment the detector device has a connection to the minus terminal of the battery. This connection is insulated from the connection elements in the same way as the first connection of the tripping element. In particular when diodes are used as the detector device a direct acquisition of polarity reversal is possible. For example, the cathode of the diode can be connected with a connection element via the insulated connection and the tripping element, while the anode is connected with the minus terminal of the battery. In the event of a polarity reversal, thus if a negative terminal is connected to the supply support point, a current can flow through the diode. The diode is operated in the forward direction, since the potential on the cathode has a negative value compared with the potential on the anode. In this way a current path from the connection elements via the insulated first connection and the tripping element to ground is created. An immediate triggering of the pyrotechnic disconnecting unit is the result since via the current path a current flows which heats up the tripping element.

According to an embodiment at least the one semiconductor element is a Zener diode. Zener diodes behave in the forward direction like normal diodes. They are characterised in particular in that in the reverse direction from a certain voltage upwards, the breakdown voltage, they become conductive. A Zener diode can be used whose breakdown voltage is at least above the operating voltage of the vehicle battery. With a vehicle battery the Zener diode can have a breakdown voltage of for example 13 V. A higher voltage applied will lead to the Zener diode becoming conductive. In this case also a current path via the tripping element will be created and a triggering of the pyrotechnic disconnecting unit will take place. Destruction of consumers as a result of excessive voltage is avoided.

Advantageously the second connection of the tripping element is welded or soldered to one of the connection elements. This guarantees a good electrical connection. In addition the manufacturing costs are low.

The connection elements can be electrically and mechanically connected with each other by gluing, for example. This guarantees secure material connection coupled with low manufacturing costs. Then the first connection element in particular can have a simple geometry. Any other options for firmly bonding the connection elements are possible.

In addition to this a friction-locked (force fit, force closure) connection of the connection elements is advantageous. Then a connection of the connection elements can in particular be released non-destructively. This allows re-use of the connection elements. Only the tripping element and the pyrotechnic disconnecting unit would have to be replaced. The result of this is a significant cost saving and low repair costs.

The second connection element for example has a receptacle. This makes assembly simple. Costs can be saved in particular if the receptacle is formed by a single unit with the second connection element.

According to one embodiment the receptacle is in the shape of a conically shaped pot. Such a shape guarantees a simple creation of the connection with the first connection element. In this way in particular optimum separation of the two connection elements is enabled.

According to one embodiment the pyrotechnic disconnecting element is arranged in the receptacle of the second connection element, in particular on the floor of the conically shaped pot. An arrangement of the disconnecting unit on the floor of the receptacle leads to a simple manufacture of the polarity reversal protection unit coupled with a secure electrical disconnection.

By way of example, initially the second connection of the tripping element could be welded or soldered to a side wall of the receptacle of the second connection element. The first insulated connection of the tripping element is connected with the detector device. This current path can for example run in a horizontal plane. Then the floor of the receptacle can be filled up by the pyrotechnic disconnecting unit. The tripping element can be arranged at the pyrotechnic disconnecting unit, with an arrangement of the tripping element within the pyrotechnic disconnecting unit being particularly preferred. Optimum triggering is the result. Then the connection between the first and the second connection elements can be created, for example by gluing. The manufacturing cost of the polarity reversal protection unit is low.

In an advantageous embodiment of the polarity reversal protection unit according to the invention the first connection element has a projection corresponding to the receptacle in the second connection element. In particular, in the conducting state the projection has a friction-locked and firmly bonded connection with the receptacle of the second connection element. By means of the connection an optimum current flow through the two connection elements is achieved. The gas pressure generated by the triggering of the pyrotechnic disconnecting unit can release the two connection elements from one another non-destructively.

According to a further embodiment the projection of the first connection element also forms a single piece with the connection element. Cost-effective manufacture is for example then achieved if the connection elements are drawn as flat parts. For example, the first connection element can be applied to the second connection element and a stamp can simultaneously form the projection and force this into the receptacle of the second connection element in order to join the connection elements together.

A preferred connection between the connection elements is a conical press fit. The connection of the connection elements can be created by inserting the projection in the tapering receptacle. Gluing or other joining of the connection elements can be dispensed with. Apart from simple manufacture, non-destructive separation of the connection elements is guaranteed.

The polarity reversal protection unit can have an acquisition device. This acquisition device can for example indicate to a user that the supply support point has been disconnected from the consumer connection. The user can then respond to the disconnection appropriately and for example initiate a repair.

The polarity reversal protection unit can be formed exclusively by the at least two connection elements, the detector device, the pyrotechnic disconnecting unit and the tripping element, but likewise may comprise any other components. In particular the polarity reversal protection unit can comprise a supply support point, a battery terminal or a battery.

A further aspect of the application is a method for interrupting a current, in particular with a polarity reversal protection unit according to the invention. With the method a first current flows from a supply support point across a second connection element connected with a first connection element to a consumer connection. In addition with the method a second current flows through a tripping element from one of the connection elements across a first insulated connection to a detector device, so that this second current causes a triggering of a pyrotechnic disconnecting unit. The triggering of the pyrotechnic disconnecting unit interrupts the current from the second connection element to the first connection element.

Figure 2:
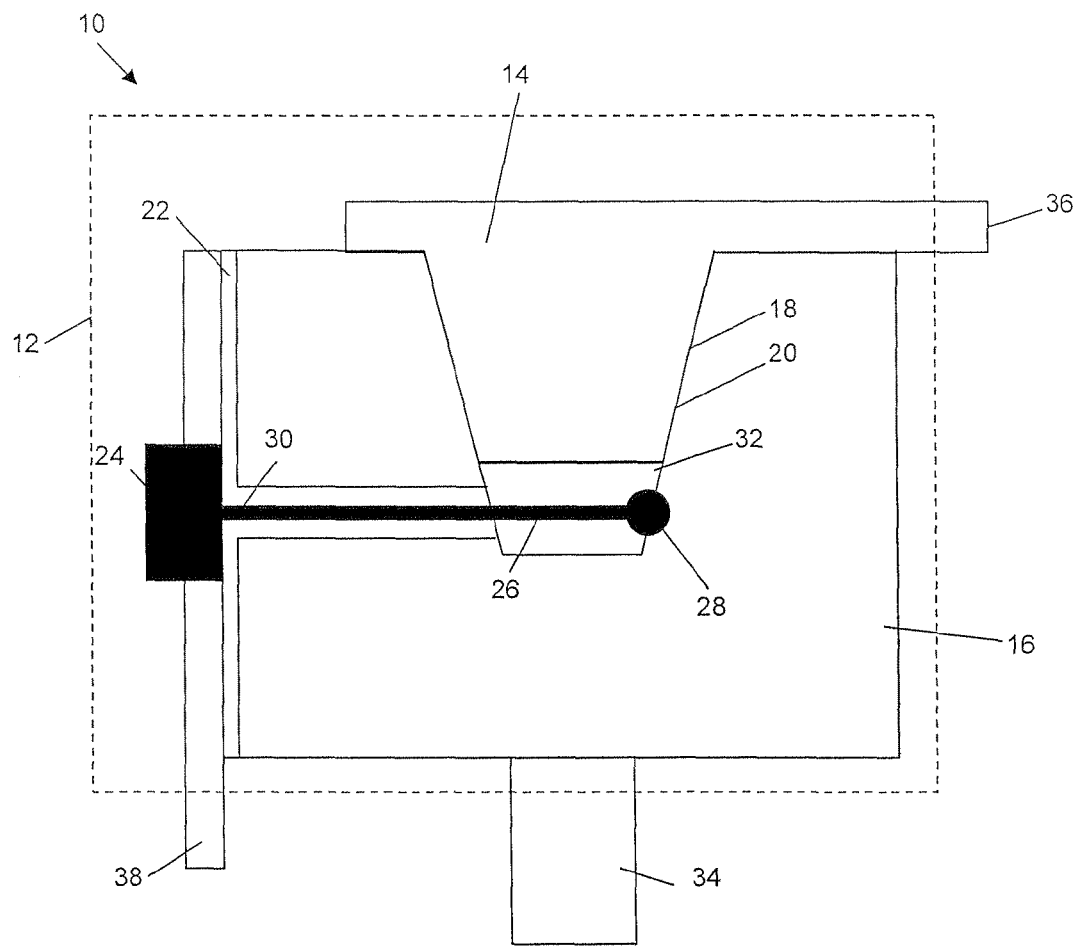
Figure 3:
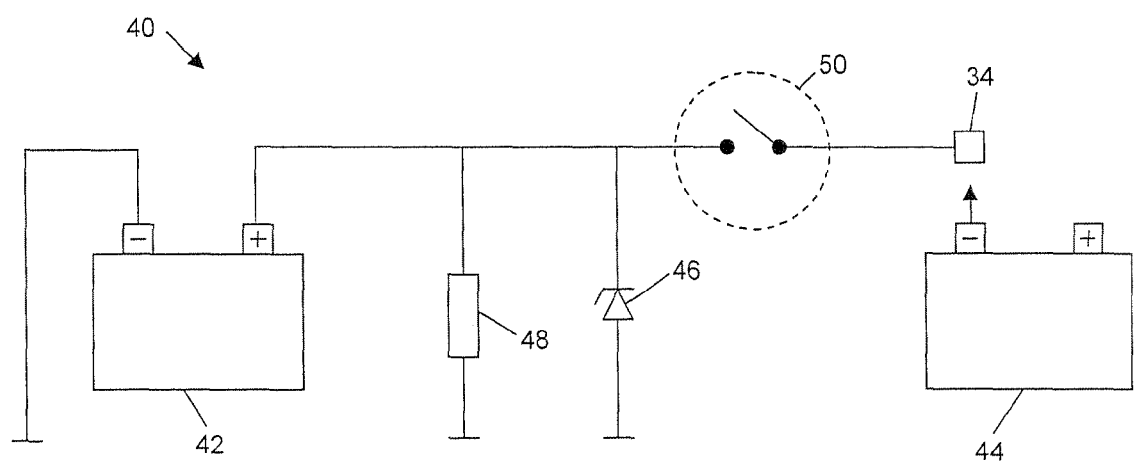

In the following the invention is explained in more detail using drawings of embodiments. These show as follows:

FIG. 1 a schematic sectional view of a first embodiment of a polarity reversal protection unit;

FIG. 2 a schematic sectional view of the first embodiment of the polarity reversal protection unit in the conducting state;

FIG. 3 a circuit arrangement of a polarity reversal protection unit.

FIG. 1 shows a simplified design of an active polarity reversal protection unit according to the invention. Here the polarity reversal protection unit is designed in such a way that cost-effective manufacture and repair and simultaneous secure protection of consumers can be guaranteed. In addition compact construction of the polarity reversal protection unit is guaranteed.

The design 10 shown in FIG. 1 comprises the polarity reversal protection unit 12. The polarity reversal protection unit 12 is arranged between a consumer connection 36 and a supply support point 34. At the consumer connection 36 for example a vehicle electrical system of a motor vehicle can be connected. The supply support point 34 can in particular be an external start support point or also a charging support point. The supply support point 34 is connected with an electrically conducting second connection element 16 of the polarity reversal protection unit 12. Manufacture of the second connection element 16 as a single part, in particular incorporating the supply support point 34, is preferred.

The connection element 16 also has a receptacle 20. On the floor of the receptacle 20 a pyrotechnic disconnecting unit 32 is arranged. The pyrotechnic disconnecting unit 32 could for example also be arranged on the side walls of the receptacle 20 or on the first connection element 14. Within the pyrotechnic disconnecting unit 32 a tripping element 26 is preferably arranged, the Joule heat given off by which can trigger the thermally operated pyrotechnic disconnecting unit 32. The tripping element 26 could also be arranged on the edge of the pyrotechnic disconnecting unit 32. Furthermore the tripping element 26 comprises a first connection 30, which is connected with a detector device 24.

The detector device 24 can comprise at least a semiconductor element, in particular at least a Zener diode 46. The detector device 24 is preferably arranged outside the second connection element 16. An arrangement of the detector device 24 outside the first connection element 14 would be possible as would an arrangement inside the connection elements 14, 16, in particular inside the pyrotechnic disconnecting unit 32. An arrangement outside of the connection elements 14, 16, guarantees that the detector device 24 of the pyrotechnic disconnecting unit 32 is not destroyed in the event of triggering. The detector device 24 can then be re-used.

An insulation layer 22 is arranged between the detector device 24 and the second connection element 16. Likewise this insulation layer 22 is arranged between the first connection 30 of the tripping element 26 and the second connection element 16. The first insulated connection 30 could likewise be connected through the first connection element 14 with the detector device 24. The detector device 24 also has an earth connection 38, which is insulated from the connection elements 14, 16 by the insulation layer 22.

The tripping element 26 also has a second connection 28. The connection of the second connection 28 with the second connection element 16 can be created by a solder or weld point. The second connection 28 could also be connected with the first connection element 14. Furthermore, the connections 28, 30 can be made from the same material as the tripping element 26 or from a different material. For example, the material of the tripping element 26 could be adapted according to the necessary Joule heat.

The first electrically conducting connection element 14 is connected with the consumer connection 36. In particular the first connection element 14 can be manufactured as one piece, incorporating the consumer connection 36. In addition the first connection element 14 has a projection 18. The projection 18 preferably has a shape that corresponds with the conical pot shape of the receptacle 20.

A current flow through the tripping element 26 to trigger the pyrotechnic disconnecting element 32 in the event of a polarity reversal is guaranteed according to the polarity reversal protection unit 12.

FIG. 2 shows the design 10 from FIG. 1 in its conducting state. The projection 18 of the first connection element has a friction-locked and firmly bonded connection with the receptacle 20 of the second connection element 16. This connection can be made by gluing. A conical press fit connection is also conceivable. A current path between the supply support point 34 and the consumer connection 36 is created.

FIG. 3 shows a simplified circuit 40 of an arrangement of the design 10 according to the invention of FIGS. 1 and 2. The references of the known components have been carried across.

The arrangement 40 comprises a battery 42, for example a vehicle battery, the negative terminal of which is connected to the vehicle bodywork. The vehicle bodywork can thus be considered to be the frame potential. To the positive terminal of the battery 42 a secondary distribution system 48, for example a vehicle electrical system, is connected. The other connection of this is connected to the vehicle bodywork. A Zener diode 46 is arranged in parallel with the secondary distribution system 48. The Zener diode 46 functions as the detector device 24 from FIG. 1 or FIG. 2. The anode of the Zener diode 46 is connected to the frame potential. Apart from the cathode of the Zener diode 46 and the connection of the secondary distribution system 48 not connected to earth a pyrotechnic disconnecting switch 50 is connected to the positive terminal of the battery 42. On the second connection of the disconnecting switch 50 a supply support point 34, for example an external start support point is arranged. A second battery 44 can be connected to the supply support point 34.

FIG. 3 shows how a polarity reversal exists if the negative terminal of the battery 44 is connected to the supply support point 34.

The way in which the polarity reversal protection unit 12 according to FIGS. 1 to 3 operates is explained in more detail in the following.

In normal operation, that is to say in the conducting state according to FIG. 2, a current flows from the supply support point 34 across the connection elements 14, 16 to the consumer connection 36, to which in particular a vehicle electrical system can be connected. Either of the connection elements 14, 16 can be connected with the positive terminal of the vehicle battery. For the purposes of clarity this is not shown in either FIG. 1 or FIG. 2. A connected vehicle electrical system can contain consumers that could be damaged or destroyed by a polarity reversal.

A polarity reversal may for example exist if an external start is to be carried out. A polarity reversal can likewise occur during a charging procedure. During a polarity reversal, by way of example, the negative terminal of an external battery 44 is connected to the supply support point 34. Thus the connection elements 14, 16 have a negative potential with respect to earth. The result of this is that the earth connection 38 of the detector device 24 has a positive potential with respect to the connection elements 14, 16. If a Zener diode 46 is used as a detector device 24, a current path between the connection elements 14, 16 and the earth connection 38 is created. The induced current generates in the tripping element 26 a Joule heat which is at least sufficient to bring about a triggering of the pyrotechnic disconnecting unit 32. This triggering which is brought about causally by the polarity reversal takes place immediately.

As a result of the gas pressure the projection 18 is separated from the receptacle 20. The current flow between the supply support point 34 and the consumer connection 36 is interrupted. The separation of the two connection elements 14, 16 takes place immediately. A secure protection of the consumers of a vehicle electrical system can be guaranteed according to the polarity reversal protection unit 12 according to the invention.

The separation of the first connection element 14 and the second connection element 16 can be carried out non-destructively. Only the tripping element 26 and the pyrotechnic disconnecting unit 32 need be replaced during a repair, while the other components can continue to be used. A cost-intensive and involved repair of the polarity reversal protection unit is not needed.

For the sake of clarity FIGS. 1 to 3 do not show an acquisition device. This could indicate to a user that the disconnection of the vehicle electrical system from the supply support point 34 has taken place. For example the current flow through the detector device 24 could be used as an indicator.

The polarity reversal protection unit 12 protects a secondary distribution system 48 not just against a polarity reversal, but also against destruction due to a possibly excessive voltage being applied. For example, a battery of a car generally has a voltage of 12 V. A number of consumers are designed accordingly and larger voltage values can lead to destruction of the connected consumers. For example, during an external start by a battery 44 of a truck. A truck battery 44 generally has a voltage of 24 V.

On the basis of these voltage values of the batteries 42, 44 an external battery with an excessive voltage is connected to the supply support point 34.

As a detector device 24 a Zener diode 46 is selected with a breakdown voltage that is at least above 12 V, for example 13 V. Since the external battery 44 has a higher voltage, for example 24 V, the Zener diode immediately becomes conductive. The result of this is that a current in the tripping element 26 generates a Joule heat, which immediately leads to the triggering of the pyrotechnic disconnecting unit 32. The flow of current to the consumers of a vehicle electrical system is immediately interrupted, so that no consumers can be damaged or destroyed.

Through the described design of a polarity reversal protection unit the desired secure protection of consumers against polarity reversal or excessive voltages is obtained with simultaneous cost-effective manufacture and low-cost repair. In addition a compact design is guaranteed.

It goes without saying that the embodiment described is only one of a number of possible embodiments. For example, in the embodiment shown for reasons of clarity as the detector unit only one Zener diode is shown, whereas an implementation may have several diodes or other semiconductor elements as well as other components.

The invention claimed is:

1. A polarity reversal protection unit comprising:
a pyrotechnic disconnecting unit;
a detector device;
a tripping element;
a first connection element electrically connected to at least a consumer connection;
a second connection element electrically connecting a supply support point to the first connection element, wherein the pyrotechnic disconnecting unit is arranged on at least one of the connection elements, the tripping element has a first connection electrically insulated from the connection elements and electrically connected to the detector device, and the tripping element has a second connection connected with one of the connection elements spatially within the pyrotechnic disconnecting unit, such that a case of polarity reversal connecting a current flow from the second connection of the tripping element to the first connection of the tripping element and to the detector device triggers the pyrotechnic disconnecting unit causing an electrical disconnection of the connection elements; and
wherein at least one of the connection elements has an opening for passing through the insulated first connection.

2. The polarity reversal protection unit of claim 1, wherein the tripping element is arranged at least in part within the pyrotechnic disconnecting unit.

3. The polarity reversal protection unit of claim 1, wherein the first connection at least within the opening is completely enclosed by an insulation layer.

4. The polarity reversal protection unit of claim 1, wherein the detector device is arranged outside of the connection elements.

5. The polarity reversal protection unit of claim 1, wherein Joule heat generated by the flow of current in the tripping element causes a triggering of the pyrotechnic disconnecting unit.

6. The polarity reversal protection unit of claim 1, wherein Joule heat generated by the permitted flow of current in the two connection elements is below Joule heat necessary for triggering the pyrotechnic disconnecting unit.

7. The polarity reversal protection unit of claim 1, wherein the detector device comprises at least one semiconductor element.

8. The polarity reversal protection unit of claim 1, wherein the detector device has a ground connection.

9. The polarity reversal protection unit of claim 7, wherein the at least one semiconductor element is a Zener diode.

10. The polarity reversal protection unit of claim 1, wherein the second connection with one of the connection elements is in the form of a soldered or welded connection.

11. The polarity reversal protection unit of claim 1, wherein the first connection element has a firmly bonded connection with the second connection element.

12. The polarity reversal protection unit of claim 1, wherein the first connection element has a friction locked connection with the second connection element.

13. The polarity reversal protection unit of claim 1, wherein the second connection element has a receptacle.

14. The polarity reversal protection unit of claim 13, wherein the receptacle is formed as a single unit with the second connection element.

15. The polarity reversal protection unit of claim 13, wherein the receptacle is a conically shaped pot formed from the second connection element.

16. The polarity reversal protection unit of claim 13, wherein the pyrotechnic disconnecting unit is arranged in the receptacle of the second connection element.

17. The polarity reversal protection unit of claim 13, wherein the first connection element has a projection corresponding with the receptacle of the second connection element, so that in the conducting state the projection is arranged with a friction locked and firmly bonded connection in the receptacle of the second connection element.

18. The polarity reversal protection unit of claim 17, wherein the projection is formed as a single unit with the first connection element.

19. The polarity reversal protection unit of claim 17, wherein the projection, following joining with the receptacle, forms a conical press fit.

20. The polarity reversal protection unit of claim 1, wherein the polarity reversal protection unit has an acquisition device to detect a disconnection of the first connection element from the second connection element.

21. The polarity reversal protection unit of claim 1, wherein the polarity reversal protection unit incorporates the supply support point.

22. A method for interrupting a current with a polarity reversal protection unit comprising:
electrically connecting a first connection element of the polarity reversal protection unit to at least a consumer connection; and
electrically connecting a supply support point to a second connection element connected with the first connection element, wherein a pyrotechnic disconnecting unit is arranged on at least one of the connection elements, a tripping element has a first connection electrically insulated from the connection elements and connected to the detector device, and the tripping element has a second connection electrically connected with one of the connection elements spatially within the pyrotechnic disconnecting unit, wherein at least one of the connection elements has an opening for passing through the insulated first connection,
wherein upon initiation of a polarity reversal at the supply support point a current flows from the second connection of the tripping element to the first connection of the tripping element and to the detector device thereby triggering the pyrotechnic disconnecting unit and causing an electrical disconnection of the connection elements.

23. A polarity reversal protection unit comprising:
a pyrotechnic disconnecting unit;
a detector device;
a tripping element;
a first connection element electrically connected to at least a consumer connection;
a second connection element electrically connecting a supply support point to the first connection element, the second connection element having a receptacle, wherein the pyrotechnic disconnecting unit is arranged on at least one of the connection elements, the tripping element has a first connection electrically insulated from the connection elements and electrically connected to the detector device, and the tripping element has a second connection connected with one of the connection elements spatially within the pyrotechnic disconnecting unit, such that a case of polarity reversal connecting a current flow from the second connection of the tripping element to the first connection of the tripping element and to the detector device triggers the pyrotechnic disconnecting unit causing an electrical disconnection of the connection elements; and wherein the first connection element has a projection corresponding with the receptacle of the second connection element, so that in the conducting state the projection is arranged with a friction locked and firmly bonded connection in the receptacle of the second connection element.

* * * * *